(12) United States Patent
Taniguchi et al.

(10) Patent No.: US 11,914,913 B2
(45) Date of Patent: Feb. 27, 2024

(54) CONTROL SYSTEM AND PRINTING APPARATUS FOR PERFORMING A PAIRING CONNECTION TO A TERMINAL DEVICE

(71) Applicant: SEIKO EPSON CORPORATION, Tokyo (JP)

(72) Inventors: Takaaki Taniguchi, Shiojiri (JP); Hideki Nishimura, Aizuwakamatsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/329,487

(22) Filed: Jun. 5, 2023

(65) Prior Publication Data

US 2023/0325136 A1 Oct. 12, 2023

Related U.S. Application Data

(63) Continuation of application No. 17/656,094, filed on Mar. 23, 2022, now Pat. No. 11,704,083.

(30) Foreign Application Priority Data

Mar. 26, 2021 (JP) .............................. 2021-052968

(51) Int. Cl.
*G06F 3/12* (2006.01)
(52) U.S. Cl.
CPC .......... *G06F 3/1292* (2013.01); *G06F 3/1204* (2013.01); *G06F 3/1236* (2013.01)

(58) Field of Classification Search
CPC ...... G06F 3/1292; G06F 3/1204; G06F 3/1236
USPC ............................................................ 358/400
See application file for complete search history.

(56) References Cited

U.S. PATENT DOCUMENTS

| 10,048,915 | B2 * | 8/2018 | Cho .................. H04N 1/00949 |
| 10,489,173 | B2 | 11/2019 | Sumiuchi |
| 2015/0222563 | A1 * | 8/2015 | Burns .................... H04W 4/80 709/226 |
| 2017/0310848 | A1 * | 10/2017 | Iwahara ............... H04N 1/4433 |
| 2019/0020783 | A1 | 1/2019 | Yokoyama |
| 2020/0314263 | A1 | 10/2020 | Sumita |
| 2021/0127247 | A1 | 4/2021 | Shimada et al. |

FOREIGN PATENT DOCUMENTS

JP 2019-220863 12/2019

\* cited by examiner

*Primary Examiner* — Allen H Nguyen
(74) *Attorney, Agent, or Firm* — WORKMAN NYDEGGER

(57) ABSTRACT

A control system includes a terminal device including a first communication unit configured to perform first Bluetooth communication and second Bluetooth communication, and a printing apparatus including a second communication unit that is connected by pairing to the terminal device to perform the second Bluetooth communication with the first communication unit, wherein the terminal device performs the first Bluetooth communication in a state where no pairing connection is made with the printing apparatus, and transmits a notification instruction command to the printing apparatus through the first communication unit, and wherein the printing apparatus performs a notification operation based on the notification instruction command when receiving the notification instruction command through the second communication unit based on the first Bluetooth communication.

30 Claims, 4 Drawing Sheets

CONTROL SYSTEM AND PRINTING APPARATUS FOR PERFORMING A PAIRING CONNECTION TO A TERMINAL DEVICE

This application is a Continuation of U.S. patent application Ser. No. 17/656,094 filed Mar. 23, 2022, which claims the benefit of and priority to JP Application Serial Number 2021-052968, filed Mar. 26, 2021. The entire disclosures of the above-mentioned applications are hereby incorporated herein by reference.

BACKGROUND

1. Technical Field

The present disclosure relates to a control system and a printing apparatus.

2. Related Art

The printing apparatus is controlled wirelessly by a terminal device such as a smartphone. Bluetooth (registered trademark) is used as such a radio communication standard. The terminal device controls the printing apparatus by making a pairing connection with a printing apparatus desired by the user and communicating with the printing apparatus.

In JP-A-2019-220863, a central terminal, which is a terminal device, is in contact with or close to a peripheral terminal such as a printing apparatus with which a user desires to make a pairing connection, thereby performing a touch event to acquire individual identification information via NFC (registered trademark) communication. In addition, the central terminal starts a scan for acquiring an advertising packet with the touch event as a trigger. Further, the peripheral terminal on which the touch event is executed starts transmitting the advertising packet. With such a configuration, even when there is a plurality of peripheral terminals, the central terminal is paired with the peripheral terminal with which the user desires to make a pairing connection.

However, in JP-A-2019-220863, since it is necessary for the user to approach the peripheral terminal and perform an event such as a touch event before the pairing connection, the action is troublesome and burdensome for the user.

SUMMARY

According to an aspect of the present disclosure, a control system includes a terminal device including a first communication unit configured to perform first Bluetooth communication and second Bluetooth communication, and a printing apparatus including a second communication unit that is connected by pairing to the terminal device to perform the second Bluetooth communication with the first communication unit, wherein the terminal device performs the first Bluetooth communication in a state where no pairing connection is made with the printing apparatus, and transmits a notification instruction command to the printing apparatus through the first communication unit, and wherein the printing apparatus performs a notification operation based on the notification instruction command when receiving the notification instruction command through the second communication unit based on the first Bluetooth communication.

According to another aspect of the present disclosure, a printing apparatus includes a notification unit that makes a notification, a printing unit that performs printing on a recording sheet pulled out from roll paper, a communication unit configured to perform first Bluetooth communication and second Bluetooth communication with a terminal device, and a controller that causes the communication unit to perform the second Bluetooth communication with the terminal device in a state where a pairing connection is made with the terminal device, wherein the controller performs the first Bluetooth communication in a state where no pairing connection is made with the terminal device, and when receiving a notification instruction command from the terminal device through the communication unit, causes the notification unit to make a notification based on the notification instruction command.

DESCRIPTION OF EXEMPLARY EMBODIMENTS

Hereinafter, embodiments will be described with reference to the drawings.

Figure 1:
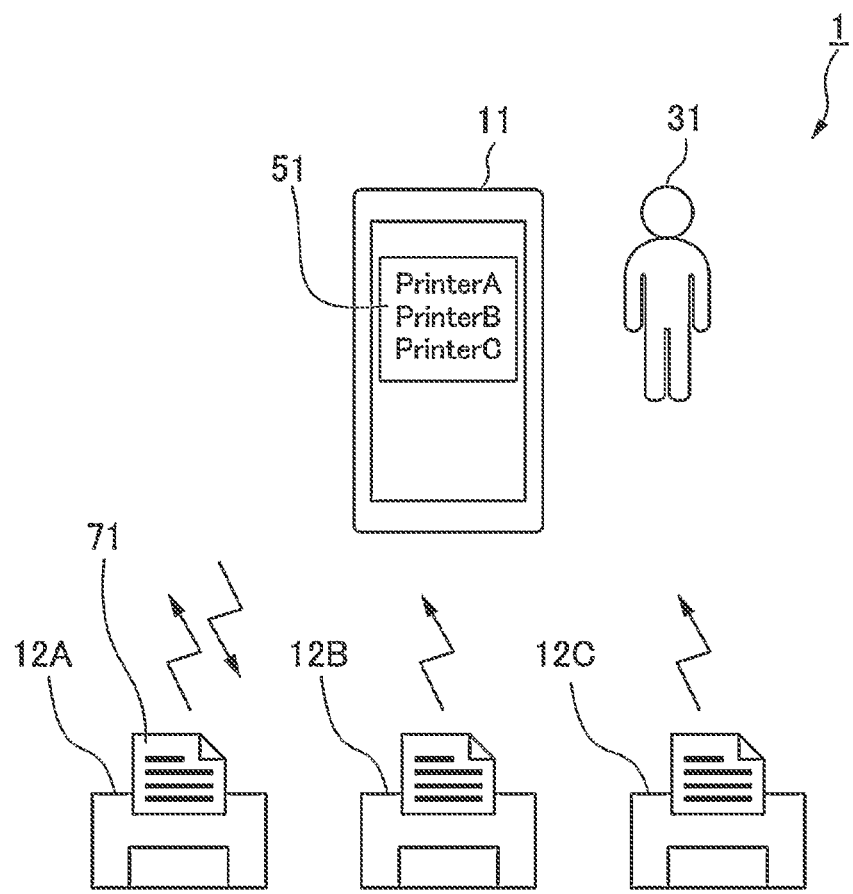
FIG. 1 is a diagram showing a schematic configuration example of a control system according to an embodiment.

FIG. 1 is a diagram showing a schematic configuration example of a control system 1 according to the embodiment. The control system 1 includes a terminal device 11, a first printing apparatus 12A, a second printing apparatus 12B, and a third printing apparatus 12C. Further, FIG. 1 shows a user 31 who operates the terminal device 11. The user 31 is an example of a user.

Here, each of the first printing apparatus 12A to the third printing apparatus 12C is an example of a printing apparatuses. In the present embodiment, one terminal device 11 is shown for the sake of simplicity, but the control system may include a plurality of terminal devices. Further, in the present embodiment, three printing apparatuses are shown as a plurality of printing apparatuses recognized by the terminal device 11, but as other examples, two printing apparatuses may be used, or four or more printing apparatuses may be used.

The terminal device 11 is a smartphone, a personal computer, or the like, and may be any other devices. In the present embodiment, the terminal device 11 is a device portable by the user 31. The terminal device 11 has a function of performing communicating according to Bluetooth (registered trademark). The terminal device 11 has a screen 51.

In the present embodiment, the first printing apparatus 12A to the third printing apparatus 12C are printing apparatuses of the same type, have the same configuration, and perform the same operation. Therefore, in the present embodiment, the configuration and operation of the first printing apparatus 12A will be described in detail, and the description of the configurations and operations of the second printing apparatus 12B and the third printing apparatus 12C will be omitted in detail.

The first printing apparatus 12A accommodates the roll paper inside the housing and prints an image on a recording sheet 71 which is pulled out from the roll paper. The first printing apparatus 12A has a function of performing Bluetooth communication. The first printing apparatus 12A may be another type of printing apparatus. Further, the first printing apparatus 12A to the third printing apparatus 12C may be any type of printing apparatus, or may be different types of printing apparatuses.

The terminal device 11 displays a list of identification information about the printing apparatus recognized by the predetermined procedure of Bluetooth on the screen 51. The predetermined procedure is a procedure for advertising Bluetooth Low Energy (registered trademark). In the present embodiment, Bluetooth Low Energy is also referred to as BLE. In the present embodiment, the identification information about the first printing apparatus 12A is "Printer A", the identification information about the second printing apparatus 12B is "Printer B", and the identification information about the third printing apparatus 12C is "Printer C".

Here, in the present embodiment, the function of Bluetooth includes the function of Bluetooth Basic Rate/Enhanced Data Rate and the function of BLE. Bluetooth Basic Rate/Enhanced Data Rate may be referred to as a Bluetooth Classic. In addition, Bluetooth Basic Rate/Enhanced Data Rate and BLE are Bluetooth functions having different specifications. The BLE communication may be referred to as a first Bluetooth communication, and the Bluetooth Basic Rate/Enhanced Data Rate may be referred to as a second Bluetooth communication. With reference to the first Bluetooth communication and the second Bluetooth communication, the first Bluetooth communication is communication that does not require pairing, but its communication speed is slower than that of the second Bluetooth communication. On the other hand, the second Bluetooth communication is communication that requires pairing, but its communication speed is faster than that of the first Bluetooth communication. In other words, each of the first printing apparatus 12A to the third printing apparatus 12C and the terminal device 11 can transmit or receive information without pairing when performing the first Bluetooth communication. On the other hand, when each of the first printing apparatus 12A to the third printing apparatus 12C and the terminal device 11 can transmit or receive information only after the pairing is established when performing the second Bluetooth communication. BLE is a communication mode with low power consumption.

Figure 2:
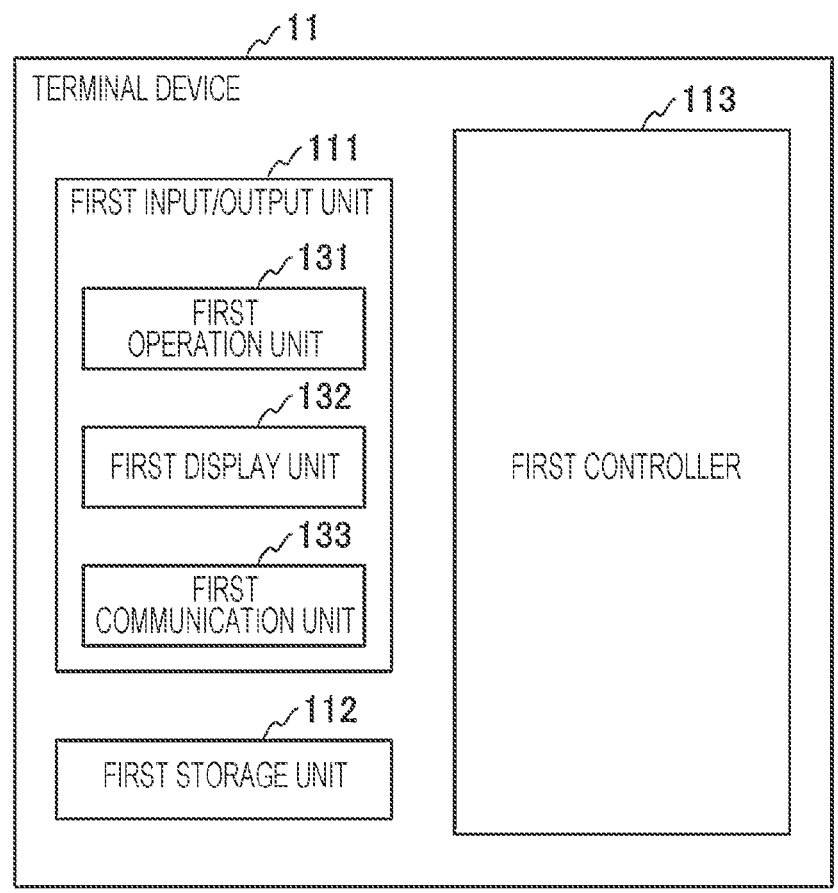
FIG. 2 is a diagram showing a configuration example of a functional block of a terminal device according to the embodiment.

FIG. 2 is a diagram showing a configuration example of a functional block of the terminal device 11 according to the embodiment. The terminal device 11 includes a first input/output unit 111, a first storage unit 112, and a first controller 113. The first input/output unit 111 includes a first operation unit 131, a first display unit 132, and a first communication unit 133. The first input/output unit 111, the first operation unit 131, the first display unit 132, the first communication unit 133, the first storage unit 112, and the first controller 113 are simply described as an input/output unit, an operation unit, a display unit, a communication unit, a storage unit, and a controller of the terminal device.

The first input/output unit 111 performs input and output. The first operation unit 131 is operated by the user 31. The first operation unit 131 may be any operation unit, or may be a touch panel, a button, a keyboard, a mouse, a voice input unit, or the like. The first display unit 132 has the screen 51 and displays information on the screen 51. The screen 51 may have a touch panel function. The first communication unit 133 has a communication interface for performing Bluetooth communication. The first communication unit 133 may have a function of performing another communication.

The first storage unit 112 stores various types of information. The first storage unit 112 may be configured by including various types of memories. The first controller 113 performs various types of control and processes. In the present embodiment, the first controller 113 performs a process of making a pairing connection with the first printing apparatus 12A to the third printing apparatus 12C. As an example, the first controller 113 performs a process of making a pairing connection when performing the second Bluetooth communication with any one of the first printing apparatus 12A to the third printing apparatus 12C. In the present embodiment, the first controller 113 is configured by including a processor such as a central processing unit (CPU). Then, the first controller 113 performs various types of control and processes by reading and executing the program stored in the first storage unit 112. The program may be a program of a predetermined application.

Figure 3:
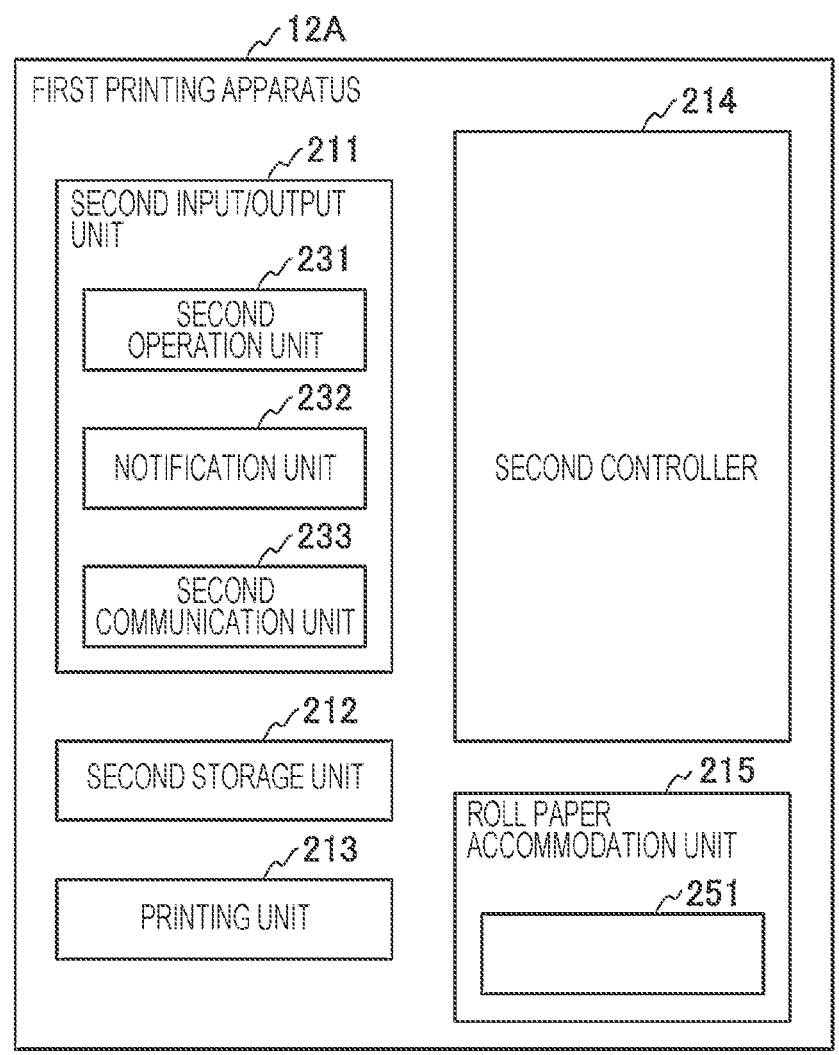
FIG. 3 is a diagram showing a configuration example of a functional block of a first printing apparatus according to the embodiment.

FIG. 3 is a diagram showing a configuration example of a functional block of the first printing apparatus 12A according to the embodiment. The first printing apparatus 12A includes a second input/output unit 211, a second storage unit 212, a printing unit 213, a second controller 214, and a roll paper accommodation unit 215. The second input/output unit 211 includes a second operation unit 231, a notification unit 232, and a second communication unit 233. The first printing apparatus 12A may be simply described as a printing apparatus, and the second input/output unit 211, the second operation unit 231, the second communication unit 233, the second storage unit 212, and the second controller 214 may be simply described as an input/output unit, an operation unit, a communication unit, a storage unit, and a controller of the printing apparatus. The roll paper accommodation unit 215 accommodates roll paper 251. The recording sheet 71, which is a print medium shown in FIG. 1, is a sheet which is pulled out from the roll paper 251. The roll paper accommodation unit 215 may be described as a roll paper holder.

Here, in the present embodiment, the first printing apparatus 12A is a small printing apparatus that does not have a screen, but as another configuration example, it may be a printing apparatus that has a screen. In this case, the second input/output unit 211 includes a display unit that displays information on the screen.

The second input/output unit 211 performs input and output. The second operation unit 231 is operated by the user 31. The second operation unit 231 may be any operation unit, for example, a button, or the like. The notification unit 232 has a function of performing a predetermined notification. As an example, the notification unit 232 includes a ringing buzzer. The notification is a notification by sounding a buzzer. As an example, the buzzer may be a sound due to vibration, or may be a predetermined melody. The notification is not limited to a notification made by the notification unit 232, and may be a notification in another mode. For example, it may be a notification by displaying a screen, printing a predetermined image, or lighting or blinking a light such as a light emitting diode (LED). The second communication unit 233 has a communication interface for performing Bluetooth communication. The second communication unit 233 may have a function of performing another communication.

The second storage unit 212 stores various types of information. The second storage unit 212 may be configured by including various types of memories. The printing unit 213 has a printing mechanism that prints an image on the recording sheet 71 which is pulled out from the roll paper 251. Further, the printing unit 213 may have a transport mechanism including a transport roller that transports the recording sheet 71, and may have a cutting mechanism that cuts the recording sheet 71 from the roll paper 251. The printing mechanism may have a thermal line head including a plurality of heat generating elements disposed along a direction intersecting the transport direction of the recording sheet 71. The cutting mechanism may have a movable blade and a fixed blade, or the movable blade may advance and retreat with respect to the fixed blade to cut the recording sheet 71. The movable blade may be described as a first blade, and the fixed blade may be described as a second blade.

The second controller 214 performs various types of control and processes. In the present embodiment, the second controller 214 performs a process of making a pairing connection with the terminal device 11. In the present embodiment, the second controller 214 is configured by including a processor such as a CPU. Then, the second controller 214 performs various types of control and processes by reading and executing the program stored in the second storage unit 212.

Figure 4:
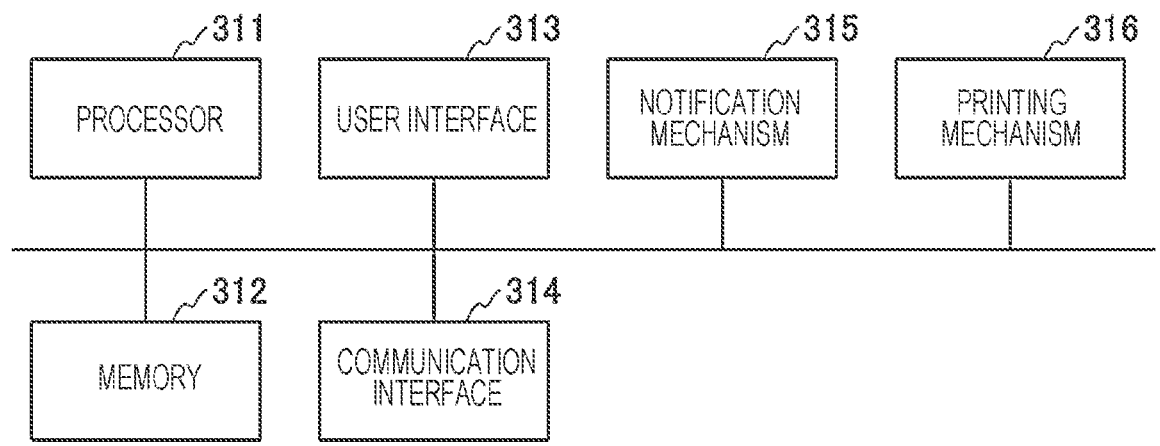
FIG. 4 is a diagram showing a schematic configuration example of the hardware of the first printing apparatus according to the embodiment.

FIG. 4 is a diagram showing a schematic configuration example of the hardware of the first printing apparatus 12A according to the embodiment. The first printing apparatus 12A includes a processor 311, a memory 312, a user interface 313, a communication interface 314, a notification mechanism 315, and a printing mechanism 316, all of which are connected via a bus.

In the present embodiment, the second controller 214 includes the processor 311. The second storage unit 212 includes the memory 312. The second operation unit 231 includes the user interface 313. The second communication unit 233 includes the communication interface 314. The notification unit 232 includes the notification mechanism 315. The printing unit 213 includes the printing mechanism 316.

Here, the BLE communication will be described. In other words, the first Bluetooth communication will be described. In the control system 1 according to the present embodiment, a generic attribute profile (GATT) defined in the Bluetooth standard is used for command transmission of the BLE communication. In the present embodiment, the terminal device 11 as the host is a central terminal, and each of the first printing apparatus 12A to the third printing apparatus 12C is a peripheral terminal.

The peripheral terminal makes an advertisement for wirelessly transmitting position information and the like, and the central terminal makes a connection request to the peripheral terminal accordingly. The central terminal transmits Service Discovery for checking the service that the peripheral terminal can perform to the peripheral terminal. In response to this, the peripheral terminal notifies the central terminal of attribute information such as "Write", "Read" or "Notify" included in its service. The attribute information may be described as a profile.

When the service of the peripheral terminal includes "Write", the central terminal transmits a command as a "Write" request to the peripheral terminal. When receiving the command, the peripheral terminal notifies the central terminal of ACK. Note that ACK is information indicating that the communication was successful. The central terminal disconnects the communication with the peripheral terminal when the communication with the peripheral terminal ends.

Such a series of communication is performed in a state where the central terminal and the peripheral terminal are not connected by pairing to each other.

Here, "Write" is attribute information indicating that the central terminal can perform writing, to the peripheral terminal, for executing a predetermined operation. Further, "Read" is attribute information indicating that the central terminal can read a predetermined value set in the peripheral terminal. Further, "Notify" is attribute information indicating that the peripheral terminal can notify the central terminal of a predetermined value.

Figure 5:
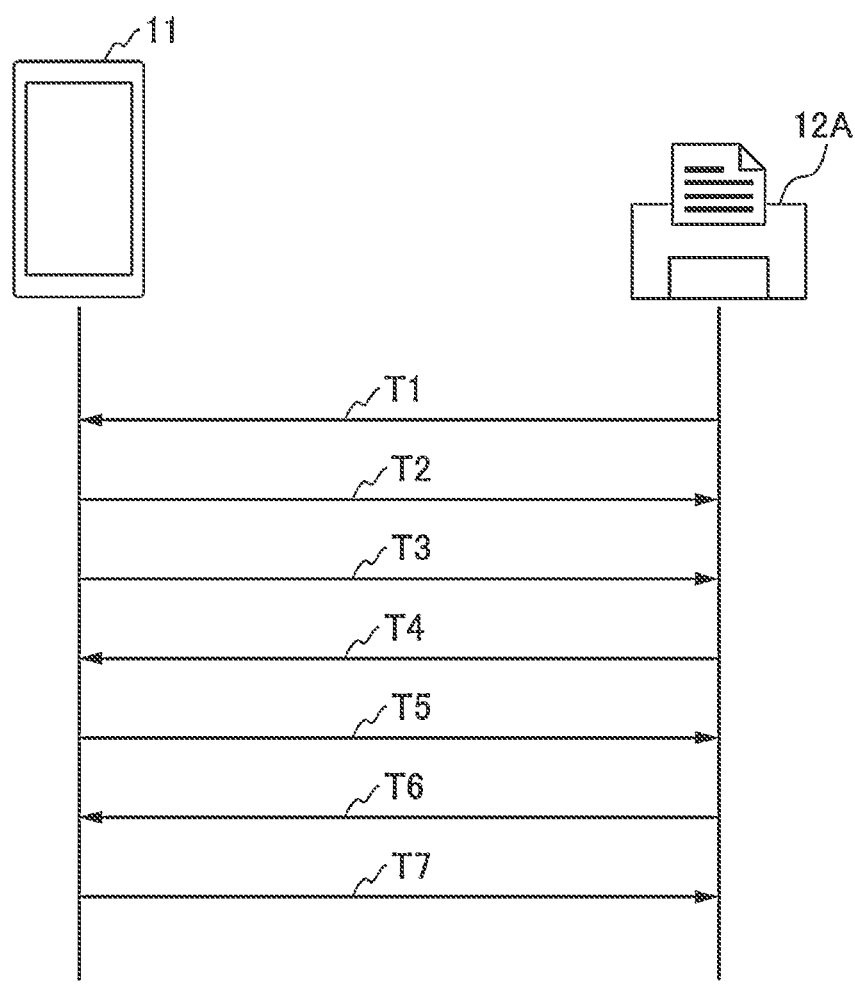
FIG. 5 is a diagram showing an example of a procedure of processing performed in the control system according to the embodiment.

The processing performed in the control system 1 will be described with reference to FIG. 5. FIG. 5 is a diagram showing an example of a procedure of processing performed in the control system 1 according to the embodiment. In the example of FIG. 5, communication between the terminal device 11 and the first printing apparatus 12A will be described. The communication of the second printing apparatus 12B and the third printing apparatus 12C is the same as the communication of the first printing apparatus 12A. The processes T1 to T7 shown in FIG. 5 will be described. These processes T1 to T7 are performed by the function of BLE, and are performed in a state where no pairing connection is made.

In the process T1, the first printing apparatus 12A wirelessly transmits the advertising packet of BLE through the second communication unit 233. The advertising packet includes identification information about the first printing apparatus 12A, which is the source. Similarly, the case where the second printing apparatus 12B and the third printing apparatus 12C also transmit the advertising packet of BLE wirelessly will be described.

Here, as the identification information included in the advertising packet by the first printing apparatus 12A to the third printing apparatus 12C, any information capable of identifying each of the first printing apparatus 12A to the third printing apparatus 12C may be included. As the identification information, for example, device name information may be included. Further, the advertising packet may include the position information about each of the first printing apparatus 12A to the third printing apparatus 12C. When each of the first printing apparatus 12A to the third printing apparatus 12C is identified by the position information or the like, the position information or the like may be used as the identification information.

The advertising packet is a signal for making a notification of the existence of the peripheral terminal. Here, in the present embodiment, the information about the advertising packet is an example of the advertisement information.

The terminal device 11 receives these advertising packets through the first communication unit 133. Then, in the terminal device 11, the first controller 113 displays the identification information included in these advertising packets on the screen 51 of the first display unit 132. FIG. 1 shows an example of the display contents of the screen 51. In the example of FIG. 1, the screen 51 shows "Printer A", which is the identification information of the first printing apparatus 12A, "Printer B", which is the identification information about the second printing apparatus 12B, and "Printer C", which is the identification information about the third printing apparatus 12C in a list.

In addition, instead of displaying the identification information included in the advertisement packet, the terminal device 11 may display another identification information corresponding to the identification information. For example, the terminal device 11 stores in advance the correspondence between the identification information included in the advertisement packet and the nickname information for each of the first printing apparatus 12A to the third printing apparatus 12C in the first storage unit 112, and instead of displaying the identification information, the nickname information corresponding to the identification information may be displayed.

The user 31 looks at the display contents of the screen 51 and manually selects the identification information about the first printing apparatus 12A desired by the user 31. This selection operation may be an operation of touching the corresponding identification information displayed on the screen 51 with a finger or the like. The terminal device 11 accepts a selection operation by the user 31.

In the process T2, the terminal device 11 wirelessly transmits the connection request to the first printing apparatus 12A selected by the user 31 through the first communication unit 133 in response to the operation of the user 31. The first printing apparatus 12A receives the connection request through the second communication unit 233. The connection request may be described as connection request information.

In the process T3, the terminal device 11 wirelessly transmits Service Discovery to the first printing apparatus 12A through the first communication unit 133. Service Discovery is a signal inquiring about a performable service. The first printing apparatus 12A receives Service Discovery through the second communication unit 233.

In the process T4, the first printing apparatus 12A wirelessly transmits "Service Write" to the terminal device 11 through the second communication unit 233. "Service Write" is a signal notifying that "Write" is performable as a service. The terminal device 11 receives "Service Write" through the first communication unit 133.

Here, in the present embodiment, Service Discovery is an example of request information for requesting information on whether a first process based on the control command is performable. The first process based on the control command may be simply described as the process based on the control command. Further, in the present embodiment, the "Write" command is an example of the control command. Further, in the present embodiment, the process of performing the notification operation is an example of the first process. Further, in the present embodiment, "Service Write" is an example of response information indicating that the first process is performable.

In the process T5, the terminal device 11 wirelessly transmits a "GATT Write" request to the first printing apparatus 12A through the first communication unit 133. The "GATT Write" request is a signal instructing to execute "Write". The first printing apparatus 12A receives the "GATT Write" request through the second communication unit 233. The "GATT Write" request may be described as operation request information.

Here, in the present embodiment, the "GATT Write" request includes the execution instruction command of the notification operation that can be interpreted by the first printing apparatus 12A. The execution instruction command of this notification operation is an example of the notification instruction command. The notification instruction command is, for example, a buzzer notification command for instructing the sounding of the buzzer of the first printing apparatus 12A. The commands that can be interpreted by the first printing apparatus 12A are, for example, ESC/POS (registered trademark) system commands. Further, in the present embodiment, the operation of making a notification by sounding the buzzer is an example of the notification operation.

In the process T6, the first printing apparatus 12A wirelessly transmits ACK to the terminal device 11 through the second communication unit 233. The terminal device 11 receives ACK through the first communication unit 133.

The first printing apparatus 12A makes a notification through the notification unit 232 in response to the notification instruction command included in the "GATT Write" request. That is, the first printing apparatus 12A sounds the buzzer. As a result, the user 31 can confirm by the sound of the buzzer that the printing apparatus called by the terminal device 11 is the first printing apparatus 12A.

In the process T7, the terminal device 11 wirelessly transmits a disconnection request to the first printing apparatus 12A through the first communication unit 133. The first printing apparatus 12A receives the disconnection request through the second communication unit 233. As a result, the BLE communication between the terminal device 11 and the first printing apparatus 12A is disconnected.

Here, the terminal device 11 continues to display a list of identification information about the first printing apparatus 12A to the third printing apparatus 12C on the screen 51 even after the BLE communication with the first printing apparatus 12A is disconnected.

Further, when the first printing apparatus 12A is selected by the user 31 in the process T1, the terminal device 11 may display a message prompting the user 31 to check whether to make a pairing connection with the first printing apparatus 12A on the screen 51 of the first display unit 132 as a pop-up screen for displaying the above-mentioned identification information list, or instead of displaying the above-mentioned identification information list.

Any timing may be used as the timing for displaying such a message by the terminal device 11. As an example, when the terminal device 11 receives the ACK from the first printing apparatus 12A in the process T6, the terminal device 11 may display the message and wait for the instruction input from the user 31. As another example, the terminal device 11 may display the message and wait for the instruction input from the user 31 after the BLE communication with the first printing apparatus 12A is disconnected. As another example, the terminal device 11 may display the message when the first printing apparatus 12A is selected by the user 31 in the process T1. In this case, the terminal device 11 continues to display the message even after the BLE communication with the first printing apparatus 12A is disconnected, and waits for the instruction input from the user 31.

When the user 31 makes a pairing connection between the first printing apparatus 12A that sounds the buzzer and the terminal device 11, the user 31 manually operates to make a pairing connection between the first printing apparatus 12A and the terminal device 11 according to the message displayed on the screen 51 of the terminal device 11. The operation of this instruction may be an operation of touching the corresponding button displayed on the screen 51 with a finger or the like. The terminal device 11 makes a pairing connection with the first printing apparatus 12A based on Bluetooth through the first communication unit 133 in response to the operation of the user 31. More specifically, the terminal device 11 makes a pairing connection based on the second Bluetooth communication (Bluetooth Basic Rate/Enhanced Data Rate communication) through the first communication unit 133. Then, the terminal device 11 causes the first printing apparatus 12A to perform printing via the second Bluetooth communication in response to the operation of the user 31.

When the first printing apparatus 12A that sounds the buzzer is not the printing apparatus desired by the user 31, the user 31 returns to the process T1 and selects the printing apparatus desired by the user 31 from the list of identification information.

As described above, in the control system 1 according to the present embodiment, the terminal device 11 searches for printing apparatuses existing in the vicinity by using the BLE communication, and displays a list of identification information about the printing apparatus on the screen 51. Then, the terminal device 11 transmits a command by BLE to the printing apparatus selected by the user 31 without making a pairing connection, and causes the printing apparatus to sound the buzzer. Therefore, in the control system 1 according to the present embodiment, the user 31 can easily determine whether the printing apparatus selected by the screen 51 is a printing apparatus for which the pairing connection is desired.

As described above, in the control system 1 according to the present embodiment, the terminal device 11 causes the printing apparatus selected by the user 31 to sound the buzzer before the pairing connection is made by Bluetooth, so that it is possible to easily check the association between the identification information about the printing apparatus that the user 31 selects on the screen 51 of the terminal device 11 and the actual physical printing apparatus. In other words, the user 31 can easily check the correspondence between the identification information about the printing apparatus selected on the screen 51 of the terminal device 11 and the actual printing apparatus by the resonance of the buzzer. As a result, the user 31 can easily search for a printing apparatus for which the pairing connection is desired even when there are a large number of printing apparatuses that are candidates for the pairing connection around the terminal device 11.

Although it is conceivable that the printing apparatus sounds the buzzer after establishing the pairing connection between the terminal device 11 and the printing apparatus, it will be more efficient with a configuration in which the printing apparatus sounds the buzzer in a state where no pairing connection is made as in the present embodiment.

An example of the configuration according to the above embodiment is shown. As a configuration example, the control system includes a terminal device including a first communication unit configured to perform first Bluetooth communication and second Bluetooth communication, and a printing apparatus including a second communication unit that makes a pairing connection with to the terminal device to perform the second Bluetooth communication with the first communication unit. The terminal device performs the first Bluetooth communication in a state where no pairing connection is made with the printing apparatus, and transmits a notification instruction command to the printing apparatus through the first communication unit. The printing apparatus performs a notification operation based on the notification instruction command when receiving the notification instruction command through the second communication unit based on the first Bluetooth communication. Therefore, since the terminal device transmits the notification instruction command to the printing apparatus in a state where no pairing connection is made to cause the printing apparatus to perform the notification operation, the user does not have to take the trouble of an event or the like involving the operation of the printing apparatus, and it is easy to identify the printing apparatus that the user desires the pairing connection. In addition, the control system 1, the first communication unit 133, the terminal device 11, the second communication unit 233, the first printing apparatus 12A to the third printing apparatus 12C, and the user 31 in the present embodiment are an example of the control system, the first communication unit, the terminal device, the second communication unit, the printing apparatus, and the user, respectively.

As a configuration example, the first Bluetooth communication is communication that is performable in a state where no pairing connection is made, and the second Bluetooth communication is communication that is performable after pairing connection is made. In other words, the first Bluetooth communication is communication that is performable in a state where no pairing connection is made, and the second Bluetooth communication is communication that is performable after the pairing connection is made or the pairing connection is completed. The communication speed of the second Bluetooth communication is faster than the communication speed of the first Bluetooth communication. Therefore, the terminal device can easily identify the printing apparatus by using Bluetooth communication having different specifications and different characteristics, and can speed up the communication with the printing apparatus based on the Bluetooth communication having a high communication speed.

As a configuration example, the terminal device transmits, to the printing apparatus, through the first communication unit, request information requesting information on whether a first process based on a control command is performable in a state where no pairing connection is made. The printing apparatus receives the request information through the second communication unit. When the first process is performable, the printing apparatus transmits, to the terminal device, through the second communication unit, response information indicating that the first process is performable according to the received request information. The terminal device transmits the notification instruction command to the printing apparatus through the first communication unit when the response information is received through the first communication unit. Therefore, the terminal device can determine the printing apparatus that can perform the control command in a state where no pairing connection is made, and can transmit the notification instruction command to the printing apparatus. Therefore, in the control system, it is possible to avoid troubles such as the printing apparatus not performing the notification operation even though the notification instruction command is transmitted from the terminal device.

As an example of the configuration, the printing apparatus transmits advertisement information through the second communication unit. The terminal device displays identification information about the printing apparatus on a screen when the advertisement information is received through the first communication unit. The terminal device transmits the request information to the printing apparatus through the first communication unit when selection of the printing apparatus is accepted based on the identification information displayed on the screen. Therefore, the can select a printing apparatus with which the user desires a pairing connection from the printing apparatuses for which the identification information is displayed on the screen of the terminal device.

As a configuration example, the terminal device disconnects a communication state with the printing apparatus after transmitting the notification instruction command to the printing apparatus through the first communication unit. Therefore, the terminal device can complete the communication for checking the printing apparatus while no pairing connection is made with the printing apparatus. As a result, for example, even when a printing apparatus that the user does not desire performs the notification operation, the user can smoothly select another printing apparatus.

As a configuration example, the printing apparatus includes a printing unit that performs printing on a recording sheet pulled out from roll paper, a communication unit configured to perform first Bluetooth communication and second Bluetooth communication with a terminal device, and a controller that makes a pairing connection with the terminal device based on the second Bluetooth communication. The controller performs the first Bluetooth communication in a state where no pairing connection is made with the terminal device, and performs the notification operation based on the notification instruction command when receiving the notification instruction command from the terminal device through the communication unit. Therefore, since the printing apparatus receives the notification instruction command from the terminal device in a state where no pairing connection is made to perform the notification operation, the user does not have to take the trouble of an event or the like involving the operation of the printing apparatus, and it is easy to identify the printing apparatus that the user desires the pairing connection. In addition, each of the first printing apparatus 12A to the third printing apparatus 12C in the present embodiment is an example of the printing apparatus.

A program for implementing the functions of any component in the device described above is recorded on a computer-readable recording medium, and the program may be loaded into a computer system and executed. The term "computer system" as used herein includes hardware such as an operating system or a peripheral device. The "computer-readable recording medium" is a portable medium such as a flexible disk, a magneto-optical disk, a ROM or a CD(compact disk)-ROM, or a storage device such as a hard disk built in the computer system. Furthermore, the "computer-readable recording medium" includes a server when a program is transmitted via a network such as the Internet or a communication line such as a telephone line, or a medium that holds a program for a certain period of time, such as a volatile memory in the computer system that is a client. The volatile memory may be, for example, a RAM. The recording medium may be, for example, a non-transitory recording medium.

Further, the above program may be transmitted from a computer system in which this program is stored in a storage device or the like to another computer system via a transmission medium or by a transmission wave in the transmission medium. Here, the "transmission medium" that transmits a program refers to a medium having a function of transmitting information, such as a network such as the Internet or a communication line such as a telephone line. Further, the above program may be a program for implementing part of the above-mentioned functions. Further, the above program may be a so-called difference file that can implement the above-mentioned functions in combination with a program already recorded in the computer system. The difference file may be referred to as a difference program.

Further, the functions of any component in any device described above may be implemented by a processor. For example, each process in the embodiment may be implemented by a processor that operates based on information such as a program and a computer-readable recording medium that stores the information such as the program. Here, in the processor, for example, the functions of each component may be implemented by individual hardware, or the functions of each component may be implemented by integrated hardware. For example, the processor may include hardware, which may include at least one of a circuit that processes a digital signal and a circuit that processes an analog signal. For example, the processor may be configured with one or more circuit devices mounted on a circuit board, or one or all of one or more circuit elements. An example of the circuit device may include an integrated circuit (IC), and an example of the circuit element may include a resistor or a capacitor.

Here, the processor may be, for example, a CPU. However, the processor is not limited to the CPU, and examples thereof may include various processors such as a graphics processing unit (GPU) and a digital signal processor (DSP). Further, the processor may be, for example, a hardware circuit including an application specific integrated circuit (ASIC). Further, the processor may be composed of, for example, a plurality of CPUs, or may be composed of a hardware circuit including a plurality of ASICs. Further, the processor may be composed of, for example, a combination of a plurality of CPUs and a hardware circuit including a plurality of ASICs. Further, the processor may include, for example, one or a plurality of an amplifier circuit and a filter circuit that process an analog signal.

Although the embodiment of this disclosure is described in detail with reference to the drawings, the specific configuration is not limited to the embodiment, and the design and the like within a range not deviating from the gist of this disclosure are also included.

What is claimed is:
1. A control system comprising:
    a terminal device configured to perform first Bluetooth communication and second Bluetooth communication; and
    a printing apparatus configured to perform the second Bluetooth communication with the terminal device in a state where a pairing connection is made, wherein
    the terminal device is configured to transmit a notification instruction command to the printing apparatus using the first Bluetooth communication in a state where no pairing connection is made, and
    the printing apparatus is configured to perform a notification operation based on the notification instruction command received from the terminal device.
2. The control system according to claim 1, wherein the first Bluetooth communication is communication that is performable in a state where no pairing connection is made.
3. The control system according to claim 1, wherein the second Bluetooth communication is communication that is performable in a state where pairing connection is made.
4. The control system according to claim 1, wherein a communication speed of the second Bluetooth communication is faster than a communication speed of the first Bluetooth communication.
5. The control system according to claim 1, wherein the first Bluetooth communication is Bluetooth Low Energy (BLE) communication.
6. The control system according to claim 1, wherein the printing apparatus performs, as the notification operation, at least one of sounding a buzzer, displaying a screen, printing a predetermined image, or lightning or blinking a light.

7. The control system according to claim 1, wherein
the terminal device transmits request information to the printing apparatus,
the printing apparatus transmits, to the terminal device, response information indicating that a process based on a control command is performable when the request information is received from the terminal device, and
the terminal device transmits, to the printing apparatus, the notification instruction command in response to receiving the response information from the printing apparatus.

8. The control system according to claim 1, wherein
the terminal device transmits, to the printing apparatus, the notification instruction command when identification information of the printing apparatus displayed on the terminal device is selected by a user, and
the printing apparatus performs the notification operation based on the notification instruction command received from the terminal device.

9. The control system according to claim 8, wherein
the printing apparatus transmits advertisement information including the identification information of the printing apparatus, and
the terminal device displays the identification information of the printing apparatus when the advertisement information is received from the printing apparatus.

10. The control system according to claim 1, wherein
the terminal device disconnects a communication state with the printing apparatus after the notification instruction command is transmitted to the printing apparatus.

11. A printing apparatus configured to perform first Bluetooth communication with a terminal device, the printing apparatus comprising:
a printing unit configured to perform printing on a recording sheet, wherein
the printing apparatus is configured to
receive a notification instruction command from the terminal device using the first Bluetooth communication in a state where no pairing connection is made, and
perform a notification operation based on the notification instruction command received from the terminal device.

12. The printing apparatus according to claim 11, wherein
the first Bluetooth communication is communication that is performable in a state where no pairing connection is made.

13. The printing apparatus according to claim 11, wherein
the printing apparatus performs second Bluetooth communication with the terminal device in a state where a pairing connection is made, and
the second Bluetooth communication is communication that is performable in a state where pairing connection is made.

14. The printing apparatus according to claim 11, wherein
the printing apparatus performs second Bluetooth communication with the terminal device in a state where a pairing connection is made, and
a communication speed of the second Bluetooth communication is faster than a communication speed of the first Bluetooth communication.

15. The printing apparatus according to claim 11, wherein
the first Bluetooth communication is Bluetooth Low Energy (BLE) communication.

16. The printing apparatus according to claim 11, wherein
the printing apparatus performs, as the notification operation, at least one of sounding a buzzer, displaying a screen, printing a predetermined image, or lightning or blinking a light.

17. The printing apparatus according to claim 11, wherein
the printing apparatus
receives request information from the terminal device,
transmits, to the terminal device, response information indicating that a process based on a control command is performable when the request information is received from the terminal device, and
receives the notification instruction command after the response information is transmitted to the terminal device.

18. The printing apparatus according to claim 11, wherein
the printing apparatus
receives, from the terminal device, the notification instruction command when identification information of the printing apparatus displayed on the terminal device is selected by a user, and
performs the notification operation based on the notification instruction command received from the terminal device.

19. The printing apparatus according to claim 18, wherein
the printing apparatus transmits advertisement information including the identification information of the printing apparatus.

20. The printing apparatus according to claim 11, wherein
a communication state between the printing apparatus and the terminal device is disconnected after the notification instruction command is received from the terminal device.

21. A control method of a printing apparatus configured to perform first Bluetooth communication with a terminal device, the control method comprising:
receiving a notification instruction command from the terminal device using the first Bluetooth communication in a state where no pairing connection is made; and
performing a notification operation based on the notification instruction command received from the terminal device.

22. The control method according to claim 21, wherein
the first Bluetooth communication is communication that is performable in a state where no pairing connection is made.

23. The control method according to claim 21, wherein
the printing apparatus performs second Bluetooth communication with the terminal device in a state where a pairing connection is made, and
the second Bluetooth communication is communication that is performable in a state where pairing connection is made.

24. The control method according to claim 21, wherein
the printing apparatus performs second Bluetooth communication with the terminal device in a state where a pairing connection is made, and
a communication speed of the second Bluetooth communication is faster than a communication speed of the first Bluetooth communication.

25. The control method according to claim 21, wherein
the first Bluetooth communication is Bluetooth Low Energy (BLE) communication.

26. The control method according to claim 21, further comprising:
performing, as the notification operation, at least one of sounding a buzzer, displaying a screen, printing a predetermined image, or lightning or blinking a light.

27. The control method according to claim 21, further comprising:
- receiving request information from the terminal device;
- transmitting, to the terminal device, response information indicating that a process based on a control command is performable when the request information is received from the terminal device; and
- receiving the notification instruction command after the response information is transmitted to the terminal device.

28. The control method according to claim 21, further comprising:
- receiving, from the terminal device, the notification instruction command when identification information of the printing apparatus displayed on the terminal device is selected by a user; and
- performing the notification operation based on the notification instruction command received from the terminal device.

29. The control method according to claim 28, further comprising:
- transmitting advertisement information including the identification information of the printing apparatus.

30. The control method according to claim 21, wherein a communication state between the printing apparatus and the terminal device is disconnected after the notification instruction command is received from the terminal device.

* * * * *